Sept. 19, 1961     E. J. KOSOWICZ     3,001,045

PRESSURE SENSITIVE SWITCH

Filed April 8, 1959     2 Sheets-Sheet 1

INVENTOR
Edward J. Kosowicz
BY
Wooster & Davis
ATTORNEYS.

Sept. 19, 1961   E. J. KOSOWICZ   3,001,045
PRESSURE SENSITIVE SWITCH
Filed April 8, 1959   2 Sheets-Sheet 2

INVENTOR
Edward J. Kosowicz
BY
Wooster & Davis
ATTORNEYS.

United States Patent Office 3,001,045
Patented Sept. 19, 1961

3,001,045
PRESSURE SENSITIVE SWITCH
Edward J. Kosowicz, 10 Rose Terrace, Trumbull, Conn.
Filed Apr. 8, 1959, Ser. No. 804,989
9 Claims. (Cl. 200—83)

This invention relates to a pressure-sensitive or pressure-responsive switch, and has for an object to provide such a switch which possesses precise operating characteristics such as are required in aircraft application, and particularly on rocket engines and similar devices.

A particular object of the invention is to provide a switch of this character which will operate satisfactorily under the extreme operating conditions of rocket engine application and similar uses, and is adapted for application where such reliable operation is required, such, for example, as fuel systems, combustion chambers, or any other application where pressures are created or applied, and a device for control or other operation responsive to changes in these pressures is required.

Another object is to provide a device of this character which will give very precise performance under severe operating conditions, particularly vibrations, shock, acceleration and temperature extremes, and will maintain this precise response and operation under these conditions.

Another object is to provide a structure in which the switch with the means operated by a pressure-sensitive element for operating the switch is assembled as a complete unit and may be mounted in and removed from the enclosing housing as a complete assembled unit independently of the pressure-responsive means, so that the device including this unit and the parts comprising the same is easily replaceable and adjustable without requiring removal or adjustment of the pressure-sensitive element.

Still another object is to provide a construction in which a pressure-sensitive element such, for example, as a thin, flexible diaphragm movable between the normal and an inoperative position is positively completely supported when in the shifted or operated position, so that it will not be ruptured by extreme pressures which might be applied thereto.

With the foregoing and other objects in view, I have devised the construction illustrated in the accompanying drawings forming a part of this specification. It is, however, to be understood the invention is not limited to the specific details of construction and arrangement shown, but may embody various changes and modifications within the scope of the invention.

The form of the device shown comprises a housing 10 enclosing a chamber 11 open at one side of the housing, which open side is closed by a removable cover 12 which may be secured in its position over the open side by any suitable means, such, for example, as the screws 13.

The device comprises a pressure-responsive means which operates a collapsible flexible sheet metal column for operating an electric switch which may be used for any desired purpose, such, for example, as a control means, an indicating means, or any other similar device.

Figure 4:
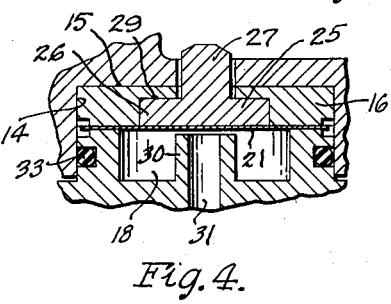
FIG. 4 is a detail section showing the diaphragm in the operated position.
Figure 5:
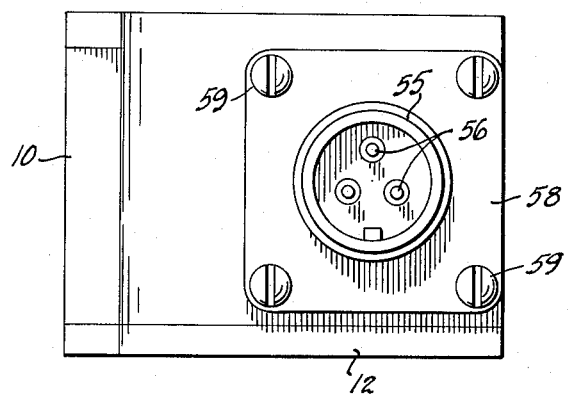
FIG. 5 is a top plan view.

In the form of FIGS. 1 to 4 the housing 10 is provided in its lower side with a recess 14 providing a top wall 15 against which is a ring member 16 mounted in the recess. Below this member is a base member 17 recessed on its upper side as indicated at 18 surrounded by a peripheral rim 19 of a size to telescope within the recess 14, and this base is attached to the housing by any suitable means such, for example, as the screws 20. The pressure-sensitive or responsive means comprises a thin, flexible diaphragm 21 preferably secured to the upper side of the rim 19 by any suitable means, such, for example, as welding or brazing, and it is securely clamped by the screws against the under side of the ring member 16. The ring member 16 is provided with a recess 22 on its lower side with an opening 23 leading upwardly therefrom to the top wall in alignment with an opening 24 in the bottom wall of the housing, and mounted in this recess and extending through these openings is a force summing element or actuator 25 which is shown as a piston-like member including a circular head portion 26 in the recess 22, and a reduced portion 27 passing through the openings 23, 24 into the lower part of the chamber 11. The top surface 28 of the recess 22 and the top surface 29 of the portion 26 form means to limit upward movement of the member 25. The base 17 is provided with an upward extension 30 of reduced diameter in the chamber 18 and provides a support to limit downward movement of the flexible diaphragm 21. An inlet passage 31 for fluid under pressure leads through the base to the under side of the diaphragm and the chamber 18. It may pass through a suitable fixture 32 to which a conduit carrying this fluid pressure may be connected. It will be seen that the construction of the base 17, diaphragm 21, ring 16 and force summing element or actuator 25 are such that the diaphragm 21 is permitted to move only a fixed distance from its lower retracted or normal position shown in FIG. 1, carrying with it the actuator 24 which is limited by the surfaces 28 and 29 in its upward movement, and that in this position the lower surfaces of the actuator 25 and the ring 16 are in substantially the same plane so that the diaphragm becomes completely backed up or supported by these surfaces in its upper position, as shown in FIG. 4. A sealing means may be provided for the base, such, for example, as an O-ring 33 in the wall of the rim 19.

The extension 27 of the actuator projects through the lower wall of the housing into the chamber 11 where it is in position to operate a switch-operating assembly. This assembly comprises a previously assembled unit removably secured as such to an upright wall of the chamber 11, and therefore a wall of the housing. This assembly includes a bracket 34 comprising an upright wall 35 and a lateral extension 36 at the lower portion thereof. The bracket and the elements carried thereby may be removably secured to a wall of the chamber and thus the housing by suitable screws 34'. Extending laterally from the upper and lower ends of the bracket are laterally extending supports 37 and 38 for a flexible resilient sheet metal spring column 39. The supports 37 and 38 are flexible resilient sheet metal plates extending forwardly from the wall 35 of the bracket and therefore provide vertically spaced substantially parallel flexible spring supports for the column 39. They may be secured to the upper and lower ends of the bracket by any suitable means, such, for example, as spot welding. They carry at their free ends means for supporting the upper and lower ends of the column 39. Those shown comprise longitudinally grooved bars 40 and 41 arranged with their grooves facing each other and into which the upper and lower ends of the column are seated. These bars are secured to the supports 37 and 38 by any suitable means, such, for example, as spot welding, and the grooves in which the ends of the column are seated are preferably tapered or substantially V-shaped, as shown, to permit limited rocking movements of the ends of the column without restriction. The supports 37, 38 may have downwardly and upwardly offset spring fingers 42 and 43 respectively at the opposite ends of the bars 40 and 41 to assist in providing positioning means to properly position the bars when mounting them on the support and also to prevent the column 39 from sliding out of position in these bars.

The spring column 39 is a flat rectangular steel plate or blade of thin section, and when inserted at its opposite ends in the grooves in the bars 40 and 41 provides a parallelogram-like mechanism or assembly with the bracket 34 and supporting members 37 and 38. This assembly structure permits the column 39 to be adjusted vertically along its longitudinal plane, which movement may be controlled by an adjusting screw 44 mounted in a suitable bushing 45 in a recess in the wall of the housing at the top of the chamber and abutting the top of the upper support 37 in alignment with the column. This structure also holds the column fixed against shifting in all other directions but permits buckling of the column under action of the pressure-responsive means.

Mounted within this parallelogram assembly and on the extension 36 of the bracket, and thus between the two supports 37 and 38, is an electric switch 46 which may be of any suitable type provided with an operating member 47 projecting from one side thereof. It is mounted on a substantially L-shaped bracket member 48 by means of any suitable means, such, for example, as the screws 49, and the member 48 is mounted to slide horizontally toward and from the column 39 by means of a screw 50 extending through an elongated slot 51 in the member 48 and threaded into the extension 36 of the bracket. The switch is thus located within this assembly at one side of the flexible column 39 and at the center thereof. The switch may be of any suitable type, but is preferably of the type which is normally spring-loaded into either the off or on position when released, and then switched to the other position when the operating member 47 is pressed inwardly. On the opposite side of the column 39 from the switch is an adjustable backing-up stop or button 52 also located at the center of the column. This in the form shown comprises a screw 53 mounted in the wall of the housing and provided with a lock nut 54 to secure it in adjusted positions. This screw and the button may be adjusted toward and from the column 39 to form a stop or abutment to prevent buckling of the column in a direction away from the switch-operating means. It may also be used to prestress or preload the column if desired.

Mounted on the top of the housing may be secured an electric socket connection 55 enclosing contact pins 56 adapted to be received in an electrical connecting device or plug and to suitable wires leading to a device to be controlled, and these pins are connected by suitable conductors 57 to the contact elements of the switch 46. The connector or socket 55 may include a flanged base 58 by which it may be mounted on the top of the housing by suitable screws 59 with an intervening gasket 60 to seal the connection to the housing and the chamber 11. If desired, there may be a threaded opening 6 through the wall of the housing to the chamber for access or connection to the chamber, and this may be closed by any suitable plug, not shown.

In operation, fluid pressure applied through the inlet 31 acts on the diaphragm 21 which is designed of a certain area for the application to which it is to be used, thus creating a force in accordance with the known principle that total force equals pressure times the effective area. This force is transmitted to the actuator 25, and by this actuator in turn is applied to the lower side of support 38 and the lower end of the spring column 39 along its longitudinal axis. As this is a vertical column and straight, so long as this force does not exceed a certain amount the column will not yield under force because of its inherent characteristic of stiffness, and there is thus no movement of the diaphragm or the actuator. As soon as this force exceeds an amount known as the critical force the column 39 will yield suddenly, buckling to one side against the actuating member 47 of the switch, as shown by the dotted line 39' in FIG. 1. As this buckling occurs, the electric switch is actuated, and simultaneously the applied force moves the diaphragm 21 and the actuator 25 to their uppermost position. This movement is limited by shoulder 29 on the actuator engaging the shoulder 28, and at this point the under surfaces of the actuator 25 and the ring 16 are in substantially the same plane, as shown in FIG. 4, so that the diaphragm becomes completely supported by these members and thus is capable of withstanding very high increases in pressure without rupture or failure. Many factors influence the force under which the column 39 will buckle.

By design, all the factors except thickness are fixed. Therefore, by varying the thickness of the column actuation pressures of different values may be obtained. It will also be seen that as the unit is a pre-assembled unit which may be removed from the housing as such, without in any way affecting the pressure-responsive element comprising the diaphragm 21 and actuator 25, the columns can be interchanged readily and without disassembly of the switch.

Figure 6:
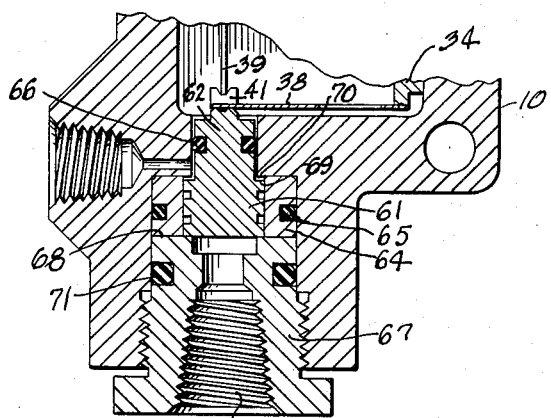
FIG. 6 is a vertical section of a portion of the device showing a modified form of pressure-responsive means.

Also with this novel means of assembling and mounting the column 39 with its associated and supporting elements, different types of pressure-responsive means may be used for operating this column and the switch. Thus in FIG. 6 is shown an arrangement whereby instead of the flexible diaphragm 21 the responsive means comprises a movable piston 61 which also includes an extension 62 engaging the under side of the column support 38. Thus the piston is responsive to the pressure which may be supplied through a conduit (not shown) connected to the device at 63. The piston is mounted in a ring or bushing 64 mounted in a recess in the lower part of the housing and sealed by means of an O-ring 65. A similar packing or O-ring 66 may be provided around the upper part or extension 62 of the piston. The bushing or ring 64 is secured in the recess in the housing by means of a plug 67 threaded into the housing and at its lower end clamped against the lower end of the bushing 64. The upper or inner end 68 of the plug 67 overlaps the lower end of the piston so as to limit downward movement of this piston, and the piston also includes a shoulder 69 adapted to engage the top wall 70 of the recess in the housing to limit upward movement of the piston and provide a positive stop and support for the pressure-responsive element. The plug 67 may be sealed by a packing such as an O-ring 71. Thus this piston acts as a pressure-responsive means the same as the diaphragm 21 in the first form, and its extension 62 corresponding to the actuator 25 will impart pressure resulting from the fluid pressure on the piston to the under side of the support 38 of the flexible column 39, which will transmit it to the lower end of this column 39 to cause it to buckle when the critical pressure is reached and operate the switch as described in connection with the form of FIG. 1.

Figures 1, 2:
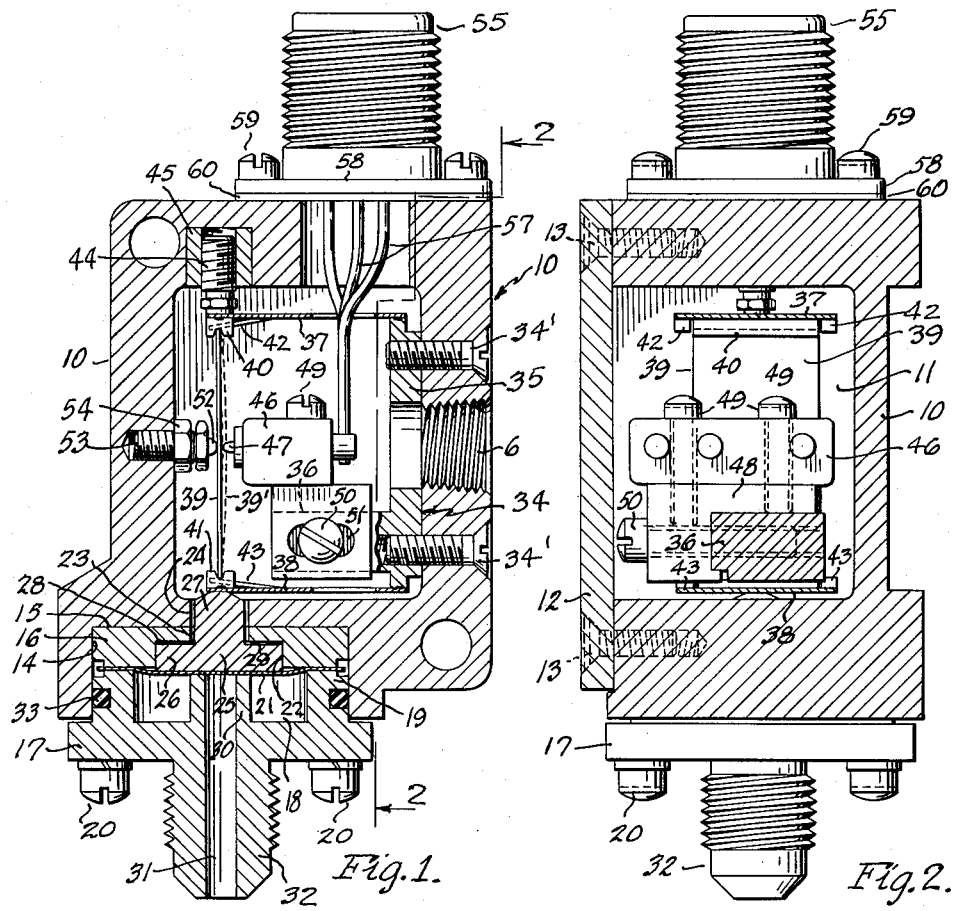
FIG. 1 is a vertical section through the device on an enlarged scale.
FIG. 2 is a similar section taken on a plane at right angles to that of FIG. 1, and substantially on line 2—2 of FIG. 1.
Figure 3:
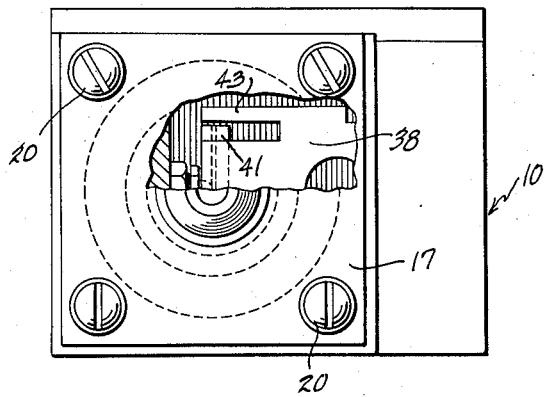
FIG. 3 is a bottom plan view with parts broken away to more clearly show the construction.
Figure 7:
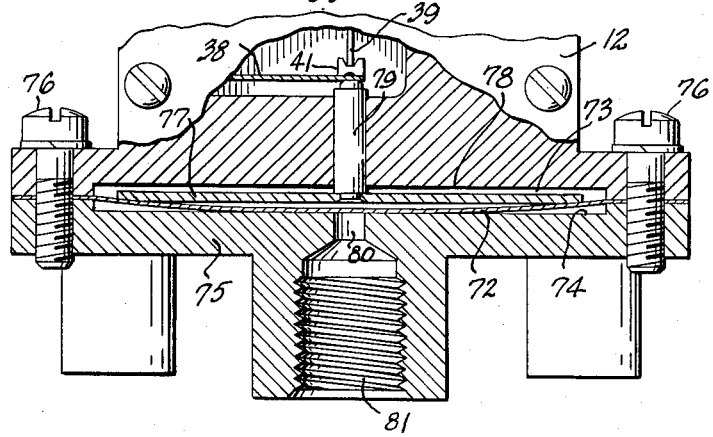
FIG. 7 is a similar section showing another modified form of pressure-responsive means.

Another form of pressure-responsive means is shown in FIG. 7, in which a thin, flexible diaphragm 72 is used. This is of larger diameter than that shown in FIG. 1 so as to be responsive to lower pressures, and instead of being supported in its upper position by the lower end of actuator 25, as shown in FIG. 1, the housing is provided with a recess 73 in its lower side opposite to and in alignment with a recess 74 in the top of the base fitting 75, and the diaphragm 72 is clamped between a peripheral rim around the recess 74 in the base fitting 75 and the peripheral rim around the recess 73 of the housing, the base fitting being secured to the housing and clamping the diaphragm by suitable screws 76. There may also be a disc 77 on the top of the diaphragm and between it and the top wall 78 of the recess forming a support for the diaphragm when it its upper or operating position. An operating element 79 is connected to this plate and presses at its upper end against the under side of the column support 38 in alignment with the flexible column 39. Fluid pressure is supplied to the under side of the diaphragm through an inlet passage 80 from a suitable conduit (not shown) connected to the base fixtures 75 at 81.

It will be understood from the above that this improved and novel construction provides precise performance under severe environmental conditions, such, for example, as vibrations, shocks, acceleration and temperature extremes, and will maintain precise reading under operations involving these conditions; also that it may be used where very high pressures might be involved, as the pressure-responsive means is positively supported and its movement limited at the end of its operational movement; also that the spring column is supported independently of the diaphragm or other pressure-responsive means, and therefore either one of these devices may be changed for others of the same or different types, and the columns can be changed or adjusted without in any way affecting the pressure-responsive means. In other words, the spring column is not dependent upon the pressure-responsive element for support. Also different types of pressure-responsive means may be used with this flexible spring column for operating the switch, just so long as this pressure-responsive means is capable of applying the resulting pressures and movements longitudinally to the flexible column from one end thereof while the other end is held or supported against longitudinal movement. When the pressure is removed from the pressure-responsive element the flexible column will spring back to its original shape by its inherent resiliency.

Having thus set forth the nature of my invention, I claim:

1. A pressure-sensitive switch comprising a housing enclosing a chamber, a unit assembly mounted in the chamber comprising a bracket, means securing the bracket to a wall of the housing, a pair of substantially parallel vertically spaced flexible supports extending laterally from the bracket, a vertical column comprising a thin flexible spring plate extending between and supported at its upper and lower ends by said supports, an electric switch mounted on the bracket between said supports including an operating means projecting therefrom and located closely adjacent one side of the column, and a movable pressure-responsive means engaging the under side of the lower support in substantial alignment with the column.

2. A pressure-sensitive switch comprising a housing enclosing a chamber, a bracket removably mounted in the chamber, a pair of vertically spaced laterally extending supports mounted on the bracket at least the lower of which comprises a thin flexible plate member, a vertical column comprising a thin flexible spring plate extending between and supported at its upper and lower ends by said supports, an electric switch mounted on the bracket between said supports and provided with an operating means at one side of and closely adjacent the column, a stop means on the opposite side of the column, and a movable pressure-responsive means engaging the under side of the lower support in substantial alignment with the column.

3. A pressure-sensitive switch comprising a housing enclosing a chamber, a bracket removably mounted in the chamber, a pair of substantially parallel vertically spaced flexible spring supports supported on the bracket and extending laterally therefrom, bars mounted on the free ends of said supports and provided with oppositely facing channels, a vertical column comprising a thin flexible spring plate seated at its upper and lower ends in said channels and supported by the supports, an electric switch between said supports, means mounting the switch on the bracket for adjustment toward and from the column, said switch including an operating means located at one side of the column for operation thereby on lateral buckling of the column, and a movable pressure-responsive means engaging the under side of the lower support in alignment with the column.

4. A pressure-sensitive switch according to claim 2 in which the chamber is open at one side closed by a removable cover, the bracket, vertical column, supports for the column and the switch comprise a unit assembly removable from the housing as such independently of the pressure-responsive means, and there are means removably supporting the bracket on one wall of the housing.

5. A pressure-sensitive switch according to claim 1 in which there is a vertically adjustable backing-up screw above the upper support in alignment with the column, and a laterally adjustable stop screw at the center of the column on the opposite side thereof from the switch operating means in position to prevent buckling of the column in a direction away from said means, said adjustable screws being accessible solely from within the chamber.

6. A pressure-responsive switch including a housing enclosing a chamber, a vertical column mounted in the chamber comprising a thin flexible spring plate, means supporting the plate at its upper and lower ends including a flexible spring support at its lower end, a pressure-responsive means including a base secured to the lower part of the housing and provided with a recessed upper surface surrounded by a raised rim, said housing provided with a recess in its under side opposite the first recess, a thin flexible diaphragm secured between the housing and base and separating said recesses, an actuator resting on the diaphragm and engaging the under side of said support in alignment with the column, stop means limiting upward movement of the actuator under action of the diaphragm, and the under side of the actuator providing a positive support for the diaphragm in its upper position against fluid pressure on the under side of the diaphragm.

7. A pressure responsive switch including a housing enclosing a chamber, a vertical column mounted in the chamber comprising a thin flexible spring plate, means supporting the plate at its upper and lower ends including a flexible spring support at its lower end, said housing provided with a downwardly facing recess in its lower wall and an opening leading from said recess to the chamber in alignment with the column, a ring member in said recess provided with a downwardly facing recess in its under side and an opening leading therefrom in alignment with the first opening, an actuator having a stem passing through said openings and engaging the under side of the lower support for the column in alignment with this column and a larger diameter flange in the recess in the ring member, said actuator having limited vertical movement in the ring member with the bottom of the recess in the ring member providing a limit stop for the top of the flange, a base member telescoped into the recess in the housing, a flexible diaphragm between the base member and the ring member, screws securing the base member to the housing and clamping the diaphragm at its periphery between the base member and the ring member, said base member provided with a fluid passage leading to the under side of the diaphragm, and the lower surface of the actuator being in substantially the same plane as the top of the recess in the ring member when the actuator is in its upper position providing with the top of the recess a positive support for the diaphragm.

8. A pressure responsive switch including a housing enclosing a chamber, a vertical column mounted in the chamber comprising a thin flexible spring plate, means supporting the plate at its upper and lower ends including a flexible spring support at its lower end, said housing provided with a downwardly facing recess in its lower wall and an opening leading from said recess to the chamber in alignment with the column, an actuator in said recess comprising a piston including a body portion and a reduced stem passing through said opening and engaging the under side of the lower support for the column, the piston being mounted for limited vertical movement with the top wall of the recess cooperating with the top end of the body of the piston to limit upward movement, a fixture in the housing under the piston limiting its downward movement, and said fixture provided with a fluid passage leading to the under side of the piston.

9. A pressure-responsive switch including a housing enclosing a chamber, a vertical column mounted in the chamber comprising a thin flexible spring plate, means supporting the plate at its upper and lower ends including a flexible spring support at its lower end, said housing provided with a downwardly facing recess in its lower wall and an opening leading from said passage to the chamber in alignment with the column, a fixture secured to the under side of the housing provided with an upwardly facing recess in alignment with the first recess, a thin flexible diaphragm separating said recesses and clamped at its periphery between the housing and the fixture, a stiffening plate on top of the diaphragm, an actuator on top of the plate extending through the opening and engaging the under side of the lower support for the column, said fixture provided with a fluid passage leading to the under side of the diaphragm, and the top wall of the recess in the housing providing a limit stop for upward movement of the plate and diaphragm and a positive backing-up support for the full area of the diaphragm against fluid pressure on the under side thereof.

References Cited in the file of this patent

UNITED STATES PATENTS

| | | |
|---|---|---|
| 1,676,155 | Pfeifer | July 3, 1928 |
| 1,680,428 | Mottlau | Aug. 14, 1928 |
| 2,253,425 | Garland | Aug. 19, 1941 |
| 2,422,342 | Dillman | June 17, 1947 |
| 2,620,413 | Johnson | Dec. 2, 1952 |
| 2,673,468 | Immel et al. | Mar. 30, 1954 |
| 2,763,747 | Spracher | Sept. 18, 1956 |
| 2,821,593 | Sogorka et al. | Jan. 28, 1958 |
| 2,844,679 | Brewer et al. | July 22, 1958 |